UNITED STATES PATENT OFFICE.

ALBERT WELLER, OF FRANKFORT-ON-THE-MAIN, GERMANY, ASSIGNOR TO VEREINIGTE CHININFABRIKEN, ZIMMER & CO., GESELLSCHAFT MIT BESCHRÄNKTER HAFTUNG, OF SAME PLACE.

PHENOL ETHER OF QUININ CARBONIC ACID.

SPECIFICATION forming part of Letters Patent No. 646,631, dated April 3, 1900.

Application filed November 18, 1899. Serial No. 737,501. (No specimens.)

*To all whom it may concern:*

Be it known that I, ALBERT WELLER, a subject of the Emperor of Germany, and a resident of Frankfort-on-the-Main, Germany, have invented certain new and useful Improvements in Pharmaceutical Products, of which the following is a specification.

In a previous invention for which United States Letters Patent No. 585,068 were obtained I showed the preparation of pharmaceutical products, being derivatives of the alkaloids of cinchona bark, having, when quinin is used, the following general formula:

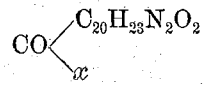

$x$ representing a single haloid atom or an alkyloxy group.

I have now succeeded in obtaining a series of further bodies which are also derivatives of the cinchona alkaloids and which when quinin is employed may be derived from the formula above stated, viz:

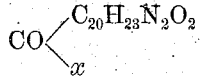

$x$ signifying, instead of an alkyloxy group, as methyloxyl ($O.CH_3$), ethyloxyl ($OC_2H_5$), benzyloxyl ($OCH_2C_6H_5$), or the like, the residue of a phenol—as, for instance, carbolic acid, paranitrophenol, thymol, pyrocatechin. These new preparations, being phenolethers of the quinin carbonic acid or the carbonic acids of other cinchona alkaloids, are all white tasteless crystals, which very readily dissolve in alcohol and chloroform, but with difficulty in water. The preparation may take place according to the method described in Patent No. 585,068 by causing phenolethers of chlorocarbonic acid as such or dissolved in a suitable solvent to act upon quinin or another cinchona alkaloid, which may or may not be anhydrous and may be either dissolved or suspended in a suitable medium, but instead of the pure alkaloids a salt of the alkaloids, as sulfate or muriate, may also be used.

The following directions may be observed in the preparation of, say, the phenolether of quinin carbonic acid: Five kilograms of quinin, forty kilograms of benzene, and 1.5 kilograms of chlorocarbonic phenolether are boiled together for some while. The reaction takes place according to the following equation:

$$C_{20}H_{24}N_2O_2 + COCl.OC_6H_5 = $$
$$CO\begin{matrix}OC_6H_5\\C_{20}H_{23}N_2O_2\end{matrix} + C_{20}H_{24}N_2O_2.H.Cl.$$

The mixture is then allowed to stand for several hours. Then the muriate of quinin is filtered, the benzene solution is agitated with water and then with diluted acid, which latter eliminates the phenolether of quinin carbonic acid from the benzene solution. By addition of an alkali to the acid solution the phenolether may precipitated and then crystallized out of a mixture of a sulfuric ether and ligroin. The phenolether of quinin carbonic acid forms fine white crystals having their point of fusion at 129° centigrade and dissolving with great difficulty in water and ligroin, but readily in alcohol, ether, and chloroform. The analysis gave:

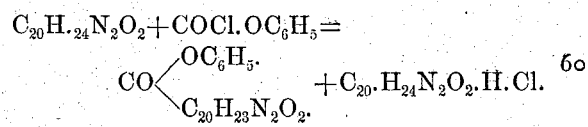

| | Found. |
|---|---|
| C = 72.97% | 73.12% |
| H = 6.30% | 6.16% |

The phenolether of quinin carbonic acid has basic properties forming crystallizing salts with acids.

The preparation may also take place by causing the phenylcarbonates to act upon cinchona alkaloids or a salt thereof—for instance, the muriate ether—by heating these bodies together directly or dissolved in a suitable solvent.

In order to convert the whole quantity of quinin into the desired ether, it is useful to take an excess of the phenolether in question. With the univalent phenols the reaction takes place according to the following scheme:

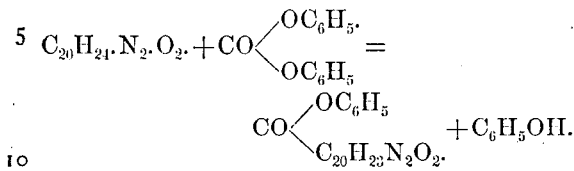

I. *Preparation of quinin carbonic phenolether.*—Equal weights of quinin and phenol carbonate are heated in an oil-bath at 120° to 130° centigrade until the melt no longer tastes bitter. While still warm the reaction mixture is dissolved in benzene, the quinin carbonic phenolether produced being then taken up by sulfuric or some other diluted acid and precipitated with alkali. It can be purified by recrystallization—for example, from ether and ligroin. The compound is identical with the above-mentioned phenolether of quinin carbonic acid prepared by action of chlorocarbonic phenol ether on quinin.

II. *Preparation of quinin carbonic paranitrophenol ether.*—Equal weights of quinin and paranitrophenol carbonate are heated together, as described above in the first example; but it is useful to take a greater excess of the carbonate. The formed paranitrophenolether of quinin carbonic acid is dissolved in benzene, taken up by a diluted acid, and precipitated with alkali. It crystallizes from the ethereal solution in white tasteless crystals, having the formula

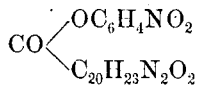

and dissolving readily in alcohol, benzene, and chloroform, but with difficulty in ether. They are melted at 187° centigrade. The analysis gave:

| Calculated for $C_{27}H_{27}N_3O_6$ | Found. |
|---|---|
| $N. = 8.59\%$ | $8.97\%$ |

The body has basic properties and forms salts. The sulfate is difficult to dissolve in alcohol. The solution in sulfuric acid shows a green fluorescence.

III. *Preparation of quinin carbonic paracetyl amidophenolether.*—It can be prepared, as described above, by melting quinin with an excess of paracetyl amidophenol carbonate; but it is better obtained by boiling equal parts of quinin and the said carbonate with xylene during ten hours on the reflux-cooler. From the xylene solution thus obtained the formed ether is separated, as above stated in example I. It can be purified by converting it into the salicylate. For this purpose to the ethereal solution salicylic acid is added until no more precipitate is obtained. The salicylate formed is crystallized out of alcohol. It forms white crystals having their point of fusion at 174° centigrade and dissolving with great difficulty in water and sulfuric ether, being likewise difficult to dissolve in cold alcohol, but readily in hot alcohol. The analysis of the salicylate led to the following result:

| Calculated for $C_{36}H_{37}N_3O_7$. | Found. |
|---|---|
| $C = 67.61\%$ | $67.76\%$ |
| $H. = 5.80\%$ | $6.08\%$ |

By shaking the salicylate with ether and diluted alkali and evaporating the ethereal solution the free paraäcetylamidophenolether of quinin carbonic acid can be obtained. Crystallized out of diluted alcohol it forms white tasteless crystals having the formula

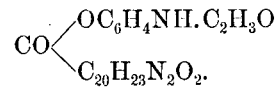

melting at 184° centigrade and being with great difficulty soluble in water and ether, but readily in alcohol and chloroform.

IV. *Preparation of quinin carbonic thymol ether.*—This body is obtained by heating quinin with an excess of thymol carbonate, as described under example I. The salicylate is precipitated by adding salicylic acid to the ethereal solution of the quinin carbonicthymolether and is then crystallized out of alcohol. It forms white crystals, melting at 172° centigrade, being readily soluble in alcohol, but dissolving with great difficulty in water and ether. By agitating the salicylate with ether and diluted alkali an ethereal solution of the free quinin carbonic thymol ether can be obtained. This solution is dried by adding chlorid of calcium, and then the thymol ether of quinin carbonic acid is precipitated by ligroin. This body has the formula

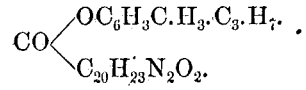

and crystallizes in white tasteless crystals, melting at 186° centigrade. The analysis of the salicylate gave the following result:

| Calculated for $C_{35}H_{42}N_2O_7$. | Found. |
|---|---|
| $C = 71.5\%$ | $71.34\%$ |
| $H = 6.6\%$ | $6.9\%$ |

V. *Preparation of quinin carbonic pyrocatechalether.*—The process is carried out exactly as in the case I, above given, according to the equation:

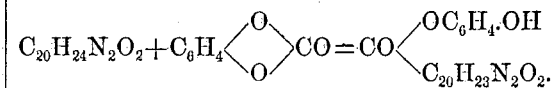

Quinin carbonic pyrocatechalether forms slender white needles which are tasteless and readily soluble in alcohol, ether, benzene, and chloroform and melt at 184° to 185° centigrade. This compound also forms salts. The sulfate is obtained by adding excess of dilute sulfuric acid to a solution of the ether in alcohol. The crystalline mass which separates is recrystallized from dilute alcohol. The sulfate forms white needles, dissolving with difficulty in alcohol, but readily in water. Analysis gave

| Calculated for $C_{27}H_{28}N_2O_5 \cdot H_2SO_4$. | Found. |
|---|---|
| N = 5.02% | 5.3% |
| $H_2SO_4$ = 21.30% | 21.29% |

The other cinchona alkaloids behave just like quinin and the phenolethers of cinchonidin or cinchonin or quinidin carbonic acid can be prepared in the same manner as above described.

Instead of treating the free bases with the phenolcarbonates the salts of the alkaloids—as, for instance, the muriates—can also be used.

The hereinbefore-described compounds and their salts are capable of useful application in medicine, as they are not only tasteless, but unite in themselves the good qualities of quinin with the antipyretic and antineuralgic action of phenol derivatives.

I claim—

The new pharmaceutical products being derivatives of the alkaloids of the cinchona bark forming tasteless white crystals, very readily soluble in alcohol and chloroform but with difficulty in water, and having, when quinin is used the general formula

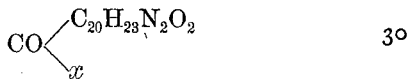

$x$ representing a phenyloxy group, substantially as and for the purpose set forth.

In testimony whereof I have signed my name to this specification in the presence of two subscribing witnesses.

ALBERT WELLER.

Witnesses:
  JEAN GRUND,
  SIMON W. HANAUER.